(12) United States Patent
Yomeyama

(10) Patent No.: US 6,972,791 B1
(45) Date of Patent: Dec. 6, 2005

(54) ELECTRONIC CAMERA AND SOLID-STATE CAMERA ELEMENT THAT PROVIDES A REDUCED PIXEL SET

(75) Inventor: Toshikazu Yomeyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/293,490

(22) Filed: Apr. 15, 1999

(30) Foreign Application Priority Data

Apr. 16, 1998 (JP) .................................. 10-123000
Jul. 24, 1998 (JP) .................................. 10-225281

(51) Int. Cl.⁷ ...................... H04N 5/235; H04N 5/335; H04N 3/14
(52) U.S. Cl. ..................... 348/230.1; 348/304; 348/302
(58) Field of Search ............................ 348/230.1, 304, 348/302

(56) References Cited

U.S. PATENT DOCUMENTS

| | | | | |
|---|---|---|---|---|
| 4,858,020 A | * | 8/1989 | Homma | 358/451 |
| 5,491,512 A | * | 2/1996 | Itakura et al. | 348/321 |
| 5,512,945 A | * | 4/1996 | Sakurai et al. | 348/221.1 |
| 5,581,301 A | * | 12/1996 | Ninomiya | 348/342 |
| 5,604,530 A | * | 2/1997 | Saito et al. | 348/70 |
| 5,734,427 A | * | 3/1998 | Hayashi | 348/333.11 |
| 5,909,247 A | * | 6/1999 | Hosokai et al. | 348/302 |
| 5,914,749 A | * | 6/1999 | Bawolek et al. | 348/273 |
| 6,067,115 A | * | 5/2000 | Suda | 348/350 |
| 6,124,888 A | * | 9/2000 | Terada et al. | 348/302 |
| 6,130,420 A | * | 10/2000 | Tanaka et al. | 250/208.1 |
| 6,480,227 B1 | * | 11/2002 | Yoneyama | 348/308 |
| 6,529,236 B1 | * | 3/2003 | Watanabe | 348/230.1 |
| 2001/0050712 A1 | * | 12/2001 | Dunton et al. | 348/220 |
| 2003/0030729 A1 | * | 2/2003 | Prentice et al. | 348/220.1 |

FOREIGN PATENT DOCUMENTS

| | | |
|---|---|---|
| JP | 09046716 | 2/1997 |
| JP | 09214836 | 8/1997 |
| JP | 09331538 | 12/1997 |

* cited by examiner

Primary Examiner—Aung Moe
Assistant Examiner—James M. Hannett
(74) Attorney, Agent, or Firm—Ipsolon LLP

(57) ABSTRACT

A solid-state camera device having a matrix of pixels arranged in rows and columns, wherein a subset of pixels of the entire pixel matrix can be read for display and confirmation of photographic conditions to reduce power consumption and decrease time to display the image. In electronic cameras light is focused on the camera device having pixels and the light energy is used to provide an electric signal from each pixel in proportion to the incident light to provide an image signal. The image signal may be displayed on an attached display such as a liquid crystal display. Because most display have fewer pixels than the camera device, the display can not display image information from each camera device pixel. To thin the number of pixels provided to the display, at least one of a vertical shift register or horizontal shift register includes a selector circuit whereby the respective shift register may select a group of rows or columns, respectively, and the selector circuit can select a single row or column, respectively, from the group. Control signals control the operation of the shift registers and selector circuit(s) and permit selection of desired thinning schemes to optimize the display of image information for best display of colors or minimum energy consumption, as desired.

8 Claims, 5 Drawing Sheets

Fig. 1
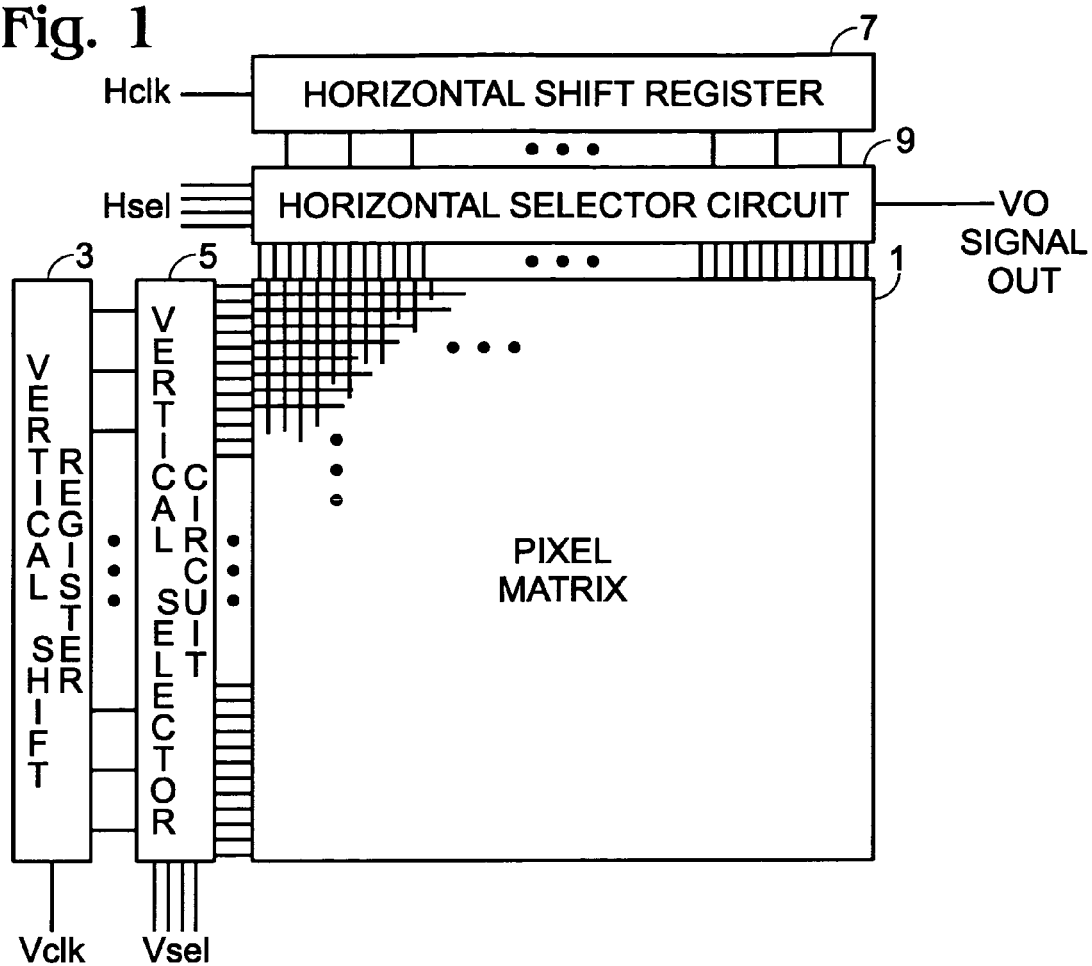
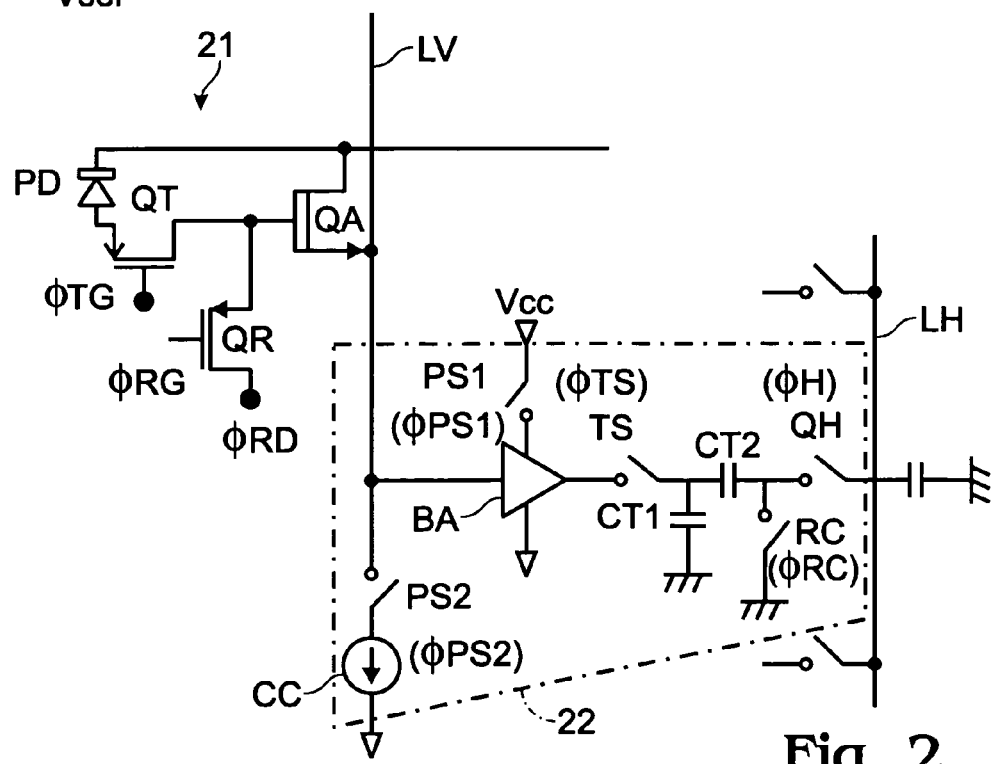
Fig. 2

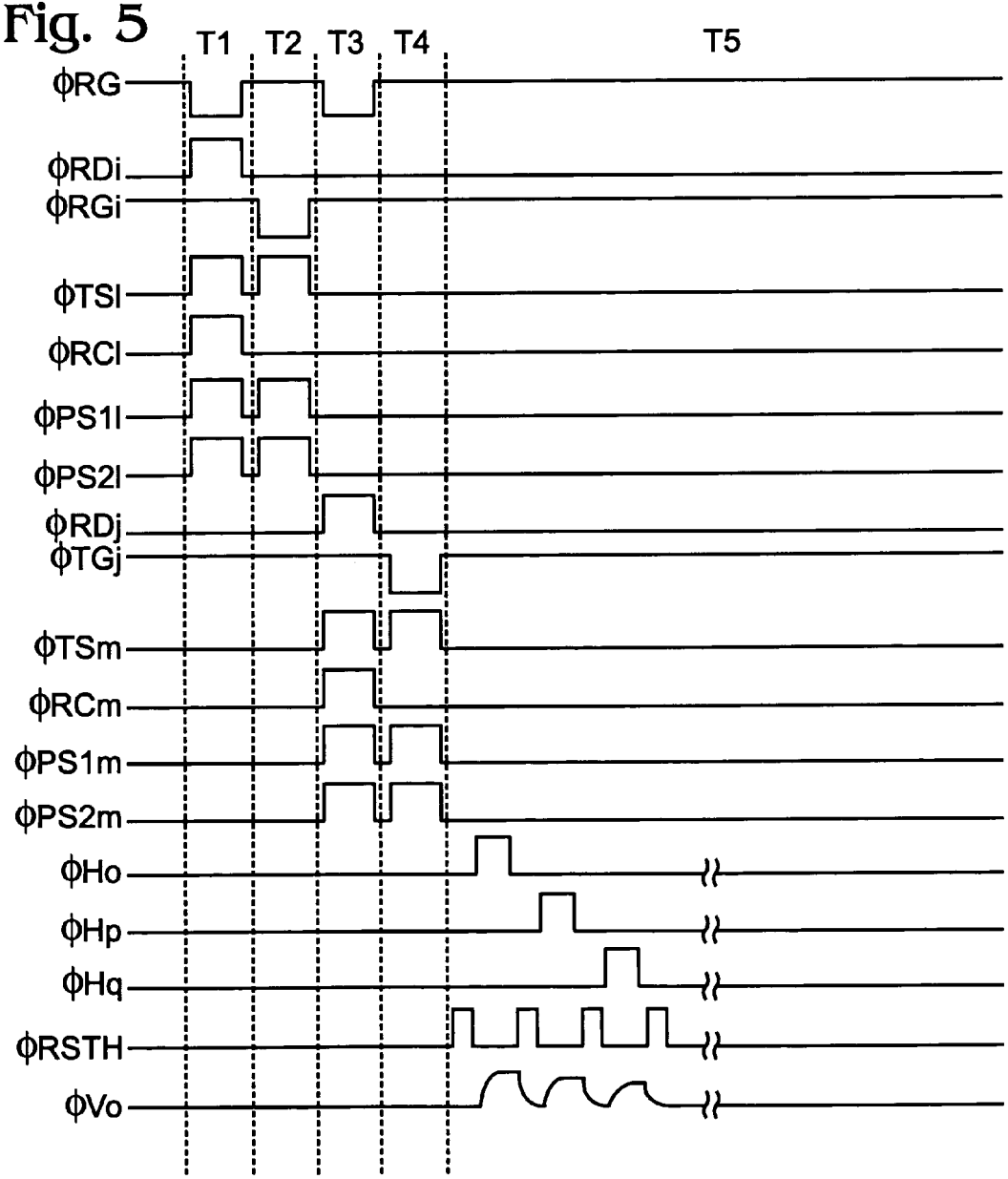

ELECTRONIC CAMERA AND SOLID-STATE CAMERA ELEMENT THAT PROVIDES A REDUCED PIXEL SET

FIELD OF THE INVENTION

This invention pertains to a solid-state camera device and an electronic camera having the solid-state camera device. More particularly, this invention pertains to reading image information from the solid-state camera device at higher speed and reduced power consumption by reading a subset of pixels of a pixel array to display images or set photographic exposure conditions before recording a photographic image.

BACKGROUND OF THE RELATED ART

Electronic cameras focus light through a lens onto a solid-state camera device having light receiving picture elements, or pixels. In charge coupled devices (CCD), these pixels include photodiodes that provide an electrical signal indicative of light incident on the pixel, and other solid-state circuitry to read (that is, transfer) the electrical signal to a display or memory. The pixels are arranged in a matrix of rows and columns. The greater the number and density of pixels in the matrix, the greater the photographic resolution. Thus, it is desirable to have a high number of pixels packed densely in the pixel matrix.

A characteristic of electronic cameras is that photographic images can be confirmed by immediate playback, and photographic conditions, such as composition and exposure, can be determined on an attached display (such as an LCD) before images are recorded. However, the number of pixels in the camera device and the display element differ, due to factors such as differences in technical progress between the two types of elements. Also, in high quality camera devices having many pixels, it is not feasible to use a display element with the same number of pixels because of the high cost of such a display.

In prior art electronic cameras, all camera device pixels are read, providing image data. This image data is temporarily stored in an image memory. Thereafter, only image data corresponding to the number of pixels required for the display element are read from the image memory. Thus, when the number of pixels of the camera device is greater than the number of pixels of the display device, image data are reduced by selective transfer of image data from the image memory. Full image data (all pixels) are used for recording the photographic image. Alternately, there are cameras that monitor the photographic object using only an optical view finder instead of an electronic display device.

This prior art operation, of reading all pixels, storing the image data from all pixels in image memory, and scanning only the required portion of image memory for display has the problems of taking a long time to execute and consuming much power. In addition, in the case of color picture elements, when image data are systematically selected from image memory, the resulting image may not include all the color signals required for proper color display.

SUMMARY OF THE INVENTION

The present invention provides a solid-state camera device that can read selected pixels of the pixel matrix to create a reduced pixel set having reduced image data for purposes of image display, or to set photographic conditions. Reading the reduced pixel set can be performed at higher speed and reduced power consumption than prior art devices that read the entire pixel matrix. When it is desired to record the photographic image, the entire pixel matrix may be read for greatest resolution.

The present invention also provides a method to obtain the reduced pixel set having image data that is proportionately comparable to the image data of the entire pixel matrix, including a reduced pixel set having color signal data that is proportionately comparable to the color signal data when all pixels are read.

The present invention also includes an electronic camera using the solid-state cameral device.

A first preferred embodiment includes a solid-state camera device having a plurality of photoelectric conversion pixels arranged in a matrix along rows and columns, a vertical scanning circuit that selects a row of the photoelectric conversion pixels, and a horizontal scanning circuit that selects a column of the photoelectric conversion pixels. The vertical scanning circuit and the horizontal scanning circuit control the reading of pixel signals and the transfer of image data from the camera device. At least one of the vertical scanning circuit or the horizontal scanning circuit includes a group scanning circuit that sequentially selects row groups comprised of several rows of pixels or column groups comprised of several columns of pixels, respectively, and a selector circuit that outputs image signals according to a selection signal by selecting a desired row or column from within the row group or column group selected by the group scanning circuit.

Therefore, it is possible to accurately read only pixels in the desired rows and columns. This process is referred to herein as "thinning" wherein a reduced pixel set is thinned from the full pixel matrix. Further, pixels can be thinned according to a selection signal supplied to the selector circuit so that the thinned pixel set can be proportionately comparable to the full pixel set, by uniformly selecting pixel rows and columns.

In a second embodiment, having a horizontal selector circuit, memory is provided to store the pixel signal from selected columns of a first row and different selected columns of a second row. Then during a horizontal reading interval, the stored signals from the first and second rows may be read and output sequentially. Thus, in this embodiment, the first and second rows comprise a single virtual row.

Therefore, select pixels can be read in a desired sequence and the quality of pixel information can be increased. Also, pixel information for a thinned pixel set can mimic color information of a full pixel set.

The present invention permits substantial control over the sequence of reading pixels to provide the reduced pixel set. In providing the reduced pixel set, it is desirable to uniformly thin the pixels so that a uniform number of pixels is read from each row and column. Alternatively, in a color pixel matrix, it is desirable to thin such that the resulting reduced pixel set mimics a sequence of pixel colors of the full pixel set.

In a further embodiment, the horizontal selector circuit includes a power cutoff function that stops power to the circuits of columns that are not read by the horizontal selector circuit. Reducing power consumption is desirable because it extends battery life for batteries that power the camera of the present invention.

In an alternative embodiment, the group scanning circuit is comprised of shift registers that can be preset globally. Presetting a shift register selects several row groups or column groups simultaneously, and can output a signal synthesized from several row or column signals by simultaneously selecting the desired several rows or columns within the row groups or column groups selected by the selector circuit. This provides a maximum luminance signal.

An electronic camera of the present invention includes a camera lens that receives image light from a photographic object, the solid-state camera device having photoelectric conversion pixels arranged in a matrix of rows and columns, the scanning circuit that reads pixels by selecting the pixels sequentially and can read by systematically thinning some pixels, and a controller that scans the solid-state camera device sequentially without thinning when obtaining image signals for photographing or recording, and scans the solid-state camera device by thinning when obtaining image signals for display.

Thus, when the number of pixels of the solid-state camera device is different from the number of pixels of a display device coupled to the electronic camera, a thinned image signal can be obtained from the camera device for use directly by the display device. Therefore, circuit structure is simplified, and the camera device can read at high speed and with reduced power consumption during display as compared to prior art.

BRIEF DESCRIPTION OF THE DRAWINGS

FIG. 1 is a block diagram showing a preferred embodiment of a solid-state camera device of the present invention.

FIG. 2 is a partial circuit diagram of one pixel of the solid-state camera device of FIG. 1.

FIG. 4 is a color matrix diagram of the array of colors of pixels in a portion of the pixel matrix in the solid-state camera device of FIG. 1.

FIG. 5 is a timing chart of the reading and thinning operation of a solid-state camera device of the present invention.

DETAILED DESCRIPTION OF THE PREFERRED EMBODIMENT(S)

Figure 8:
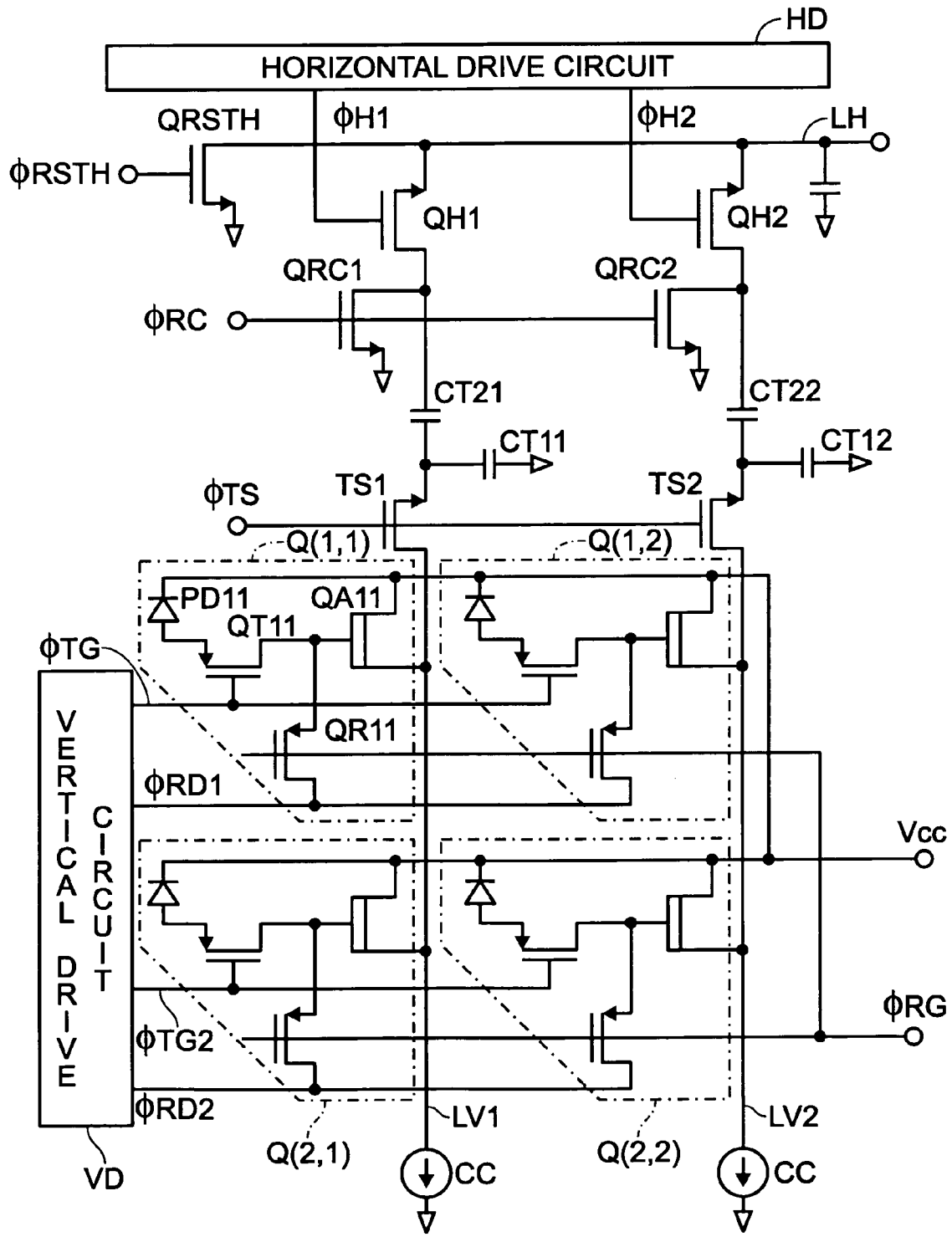
FIG. 8 is a partial circuit diagram showing a schematic structure of a prior art solid-state camera device.

Before explaining modes of embodiment of this invention, a prior art BCAST system solid-state camera device is explained in summary by reference to FIG. 8. For purposes of explanation, the solid-state camera device of FIG. 8 has four pixels Q(1,1), Q(1,2), Q(2,1), and Q(2,2) arranged in a matrix of two rows and two columns. Each pixel is comprised of photodiode PDij that is a photoelectric conversion element, an amplifier element QAij (comprised, for example, of a junction type field effect transistor (JFET)), a transfer element QTij (exemplarily comprised of a MOSFET) that transfers the charge of the photodiode PD to the gate of amplifier element QAij, and a switch element QRij (exemplarily comprised of a MOSFET) for presetting the gate electrode of amplifier element QAij. The letters i and j correspond to the row and column numbers, respectively.

In addition, transfer control switch TSj and capacitor CT2j are connected in series between vertical reading line LVj and horizontal reading switch QHj. In addition, capacitor CT1j is connected between transfer switch TSj and capacitor CT2j, and ground.

The dark output (dark current) of a first selected row is read during a vertical retrace interval. A gate signal φRG is applied to the reset switch element Qrij and a signal V1 is applied to φRDi of the selected row and signals V2 are applied to φRDi of non-selected rows. Here, V1 is a voltage when amplifier element QAij is on, and V2 is a voltage when amplifier element QAij is off. At this time, when both transistor switch QRCj and transfer switch TSj are turned on by applying reset signal φRC and switch signal φTS, the dark output of the selected row is stored in capacitors CT21 and CT22. Next, reset switch elements QRij and row reset elements QRCj are turned off by stopping application of φRG and φRC (i.e., signals φRG and φRC revert to their states that turn off switches Qrij and QRCj). Also, transfer signal φTG1 (assuming row 1 is the selected row) is applied to QT1j and φTS is maintained in a state to keep switch TSj on. As a result, image signals accumulated in photodiode PD1j are transferred to the gate of amplifier element QAij and pixel information is read and accumulated in capacitors CT11 and CT12. The signals of all pixels in the selected row are read and accumulated simultaneously. This is called vertical reading or row reading. Alternately, in the following embodiments, this is indicated as reading row m.

After completing vertical reading as described above, horizontal reset signal φRSTH is applied to reset the residual charge of the horizontal reading line LH. Then, column selection signals, for example φH1, are applied sequentially from the horizontal drive circuit HD to horizontal reading switches QH1 and signal charges accumulated in capacitors CT11 and CT21 are read. When the charge of horizontal reading line LH is reset again by applying φRSTH and φH2, the signal accumulated in capacitors CT12 and CT22 is read. This is called horizontal reading or column reading. Alternately, in the following embodiments, this is indicated as reading column n.

Next, the embodiments of this invention are explained with reference to FIGS. 1–7.

FIG. 1 shows a preferred embodiment of a solid-state camera device of the present invention. The solid-state camera device of this figure includes pixel matrix 1 in which photoelectric conversion pixels are arranged in a matrix, vertical shift register 3 and vertical selector circuit 5 for scanning pixel matrix 1 vertically, and horizontal shift register 7 and horizontal selector circuit 9 for scanning pixel matrix 1 horizontally.

Each pixel in pixel matrix 1 can be comprised of any photoelectric conversion pixel desired, but preferably these are amplifying type photoelectric conversion pixels that have a photoelectric conversion element such as a photodiode and an amplifying circuit.

Vertical shift register 3 receives vertical clock signal Vclk, outputs a signal of a particular voltage sequentially for each circuit stage, and selects a row group comprised of a particular number of rows. Horizontal shift register 7 likewise receives horizontal clock signal Hclk, outputs a signal of a particular voltage sequentially for each circuit stage, and selects a column group comprised of a particular number of columns. Vertical selector circuit 5 and horizontal selector circuit 9 output the signals required for selecting a further particular row and column from within the respective row group and column group selected according to the outputs for each circuit stage from vertical shift register 3 and horizontal shift register 7, and apply these signals to pixel matrix 1.

In a preferred embodiment, vertical shift register 3 and horizontal shift register 7 has one-fourth the number of circuit stages as the number of pixels in each of the vertical and horizontal directions of pixel matrix 1. Therefore, each of vertical shift register 3 and horizontal shift register 7 selects a row or column group comprised of four rows or columns, respectively.

FIG. 2 shows a preferred structure of a pixel 21 and reading circuit 22 of the solid-state camera device of the present embodiment. The circuit includes pixel 21, reading circuit 22, vertical reading line LV, and horizontal reading LH.

Pixel 21 has photodiode PD, transfer switch QT, amplifier element QA, and reset switch element QR, similar to the structure of the pixel shown in Figure 8. In reading circuit 22, switch element PS2 is installed between vertical reading line LV and constant-current source CC. In addition, a separate switch element PS1 that amplifies the output from vertical reading line LV is installed in the power source circuit of buffer amplifier BA.

As explained below, switch elements PS1 and PS2 are designed such that power consumption may be reduced by turning these switch elements off for thinned pixels (i.e., the pixels that are not read). For pixels for which signals are read, the switches are arranged such that both these switch elements PS2 and PS1 are turned on, and amplifier element QA of pixel 21 acts as a source follower by the action of constant-current source CC, and the output from the source follower can be output to downstream circuit stages via buffer amplifier BA.

Figure 3:
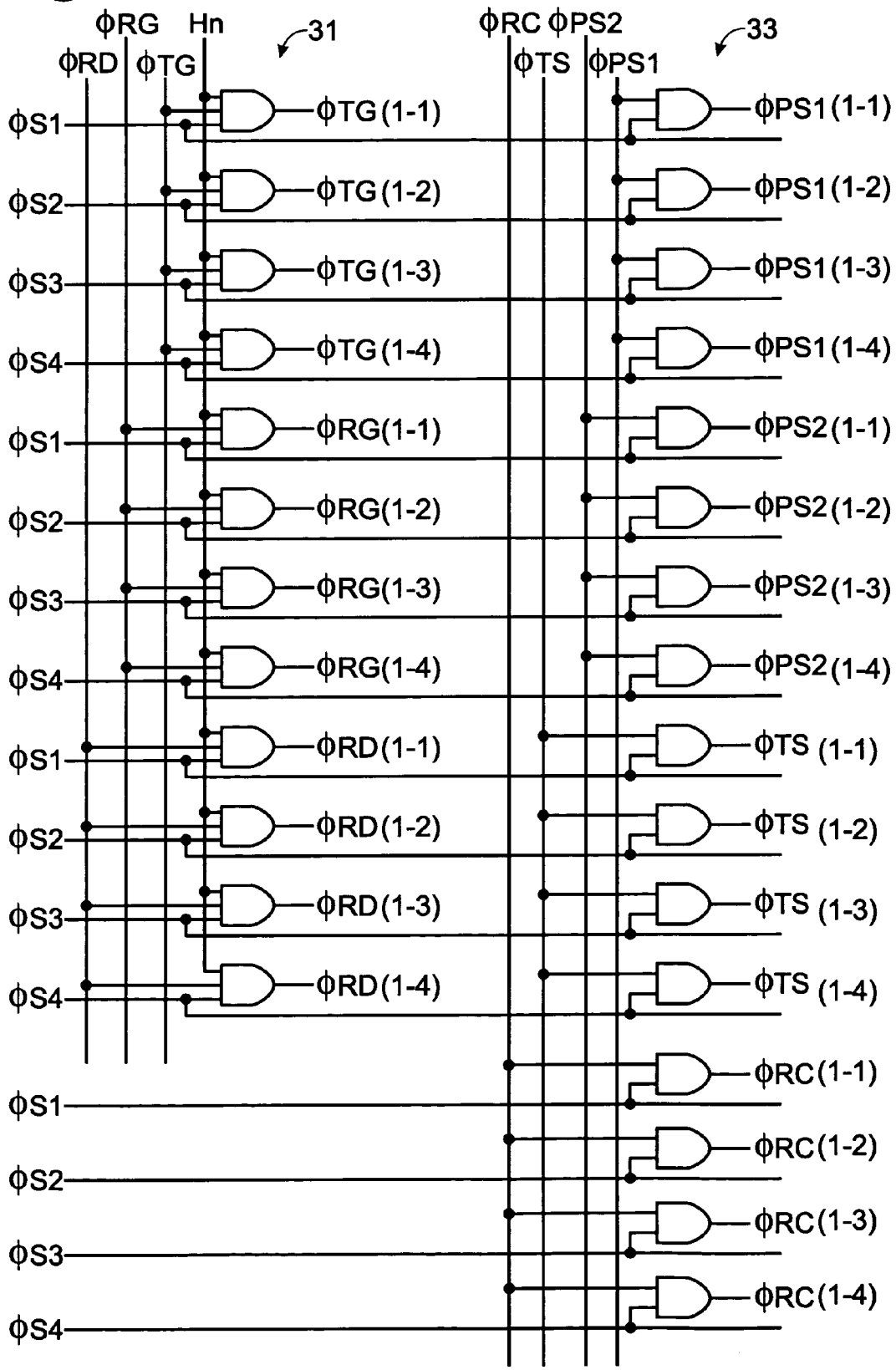
FIG. 3 is a partial circuit diagram of one block of the horizontal and vertical selector circuits in the solid-state camera device of FIG. 1.

FIG. 3 shows a circuit structure for one block of vertical selector circuit 5 and horizontal selector circuit 9 in the solid-state camera device of FIG. 1. In the case of vertical selector circuit 5, the block is four rows, and in the case of horizontal selector circuit 9, the block is four columns. FIG. 3 is exemplary of the first row block and the first column block and signals applied to row and column blocks are designated by block and row or column number such that (B-i) designates the block B and i designates the row. Similarly, (B-j) designates block B and column j within block B.

The circuit of FIG. 3 has first AND gate group 31 comprised of three-input AND gates, and second AND gate group 33 comprised of two-input AND gates. First AND gate group 31 performs AND operation between, for example, address signal $\phi Hn(\phi Hi)$ the shift register, selection signals $\phi S1$, $\phi S2$, $\phi S3$, and $\phi S4$, and control signals $\phi TG$, $\phi RG$, and $\phi RD$ to select a row within the block.

Because the vertical selector circuit 5 provides controls signals $\phi TG$, $\phi RG$, and $\phi RD$, and the row block addresses four rows, first AND gate group is provided with three sets of four AND gates to control application of control signals $\phi TG$, $\phi RG$, and $\phi RD$ to each of the four rows within the block. Thus, the first four AND gates in first AND gate group 31 can apply control signals $\phi TG$ (1-i), (i is the row number within the row block=1, 2, 3, or 4); the second set of four AND gates can apply the signals $\phi RG(1-i)$; and the third set of four AND gates can apply the signals $\phi RD(1-i)$.

The control signals $\phi Hn$ are provided by the shift register to select the block within which reading will occur. Though not shown, additional lines are provided for each signal $\phi Hn$ from the shift register to the selector circuit.

Second AND gate group 33 in FIG. 3 performs AND operation between control signals $\phi PS1$, $\phi PS2$, $\phi TS$, and $\phi RC$ and selection signals $\phi S1$, $\phi S2$, $\phi S3$, and $\phi S4$. This second AND gate group 33 thus outputs the control signals for processing image signals, such as accumulating the signal output to the vertical reading line during the horizontal retrace interval. To wit, second AND gate group provides the control signals $\phi PS1$, $\phi PS2$, $\phi TS$, and $\phi RC$ for selected columns within a selected column block.

Because there are four control signals and four columns within the exemplary column block, the second AND gate group 33 comprises four sets of four AND gates, as shown. The first set of four AND gates provide signals $\phi PS1$ for the four columns within the column block. The second, third, and fourth sets of four AND gates provide the controls signals $\phi PS2$, $\phi TS$, and $\phi RC$, respectively, as instructed.

Both first and second AND gate groups 31 and 33 can select plural rows or columns according to selection signals $\phi S1$, $\phi S2$, $\phi S3$, and $\phi S4$ so long as they are within the same block. For example, when selection signals $\phi S1$ and $\phi S3$ are applied simultaneously to second AND gate group 33, the latter can select and output $\phi TS(1-1)$ and $\phi TS(1-3)$, simultaneously.

Reading All Pixels

A preferred method of reading all pixels in the pixel matrix 1 of the camera device is now described. First, a first row block is selected by vertical shift register 3, and a first row within the first row block—that is, pixel matrix row 1—is selected by vertical selector circuit 5. The signal of vertical shift register 3 is applied as signal $\phi Hn$ in FIG. 3, and $\phi S1$ is applied as the vertical selection signal. Likewise, horizontal shift register 7 independently selects a first column block in the same manner and a first column within the first block—that is, pixel matrix column 1—is selected by horizontal selector circuit 9. Thus, signal information of a pixel at row 1 and column 1 of the pixel matrix is read. This is referred to herein as pixel (1,1).

Next, the pixels at columns 2, 3, and 4 are read by sequential operation of the horizontal selector circuit 9 with no change of setting in the horizontal shift register 7. Next, horizontal shift register 7 is advanced one stage to enable selection of the second column block (matrix columns 5 to 8) and pixels at (1,5), (1,6), (1,7), and (1,8) are read sequentially by the selector circuit. The process continues when horizontal shift register 7 is advanced one more stage and the pixels at (1,9), (1,10), (1,11), and (1,12) are read sequentially.

After reading the pixels of row 1, row 2 pixels are read by the same method. Thus, vertical selector circuit 5 selects row 2 (the second row of the row block) and horizontal shift register 7 and horizontal selector circuit 9 read row 2 pixel signals sequentially in the same way as described above. Rows 3 and 4 are read in the same way.

When reading the four rows of the first row block is completed, vertical shift register 3 is advanced one stage to enable reading the second row block, and rows 5, 6, 7, and 8 are read sequentially by vertical selector circuit 5 in the manner described above.

Simple ½ Thinning

Next, simple ½ thinning is explained in which one out of every two pixels of both columns and rows is thinned. As described above, vertical shift register 3 is enabled to select the first row block and vertical selector circuit 5 selects the first row. To read horizontal columns, horizontal shift register 7 and horizontal selector circuit 9 are enabled to read column 1 of the first column block, as described above. Next, keeping horizontal shift register 7 at the same setting without advancing, horizontal selector circuit 9 selects pixel (1,3) in column 3, which is then read. Next, horizontal shift register 7 is advanced one stage to the next column group (columns 5, 6, 7, and 8) and the horizontal selector circuit selects the first column of the second column block—that is, matrix column 5, which is then read. Thereafter, the third column of the second column block—that is, matrix column 7—is read. Thus, far, the following pixels are have been read: (1,1), (1,3), (1,5), and (1,7). Similarly, (1,9), (1,11), (1,13), (1,15), . . . are read in the same way until all selected pixels of the row are read.

When reading row 1 is completed, the vertical selector circuit selects the third row of the first row block—that is, pixel matrix row 3—and reads pixels (3,1), (3,3), (3,5), (3,7), . . . . When reading row 3 is completed, vertical shift register 3 is advanced one stage to enable selection of the second row block, matrix rows 5 to 8, and then the first and third rows of the second row block—that is, pixel matrix rows 5 and 7—are read. By continuing the operation described above, the sequence of read pixels becomes as shown in the following table:

TABLE 1

(1,1), (1,3), (1,5), (1,7) . . .
(3,1), (3,3), (3,5), (3,7) . . .
(5,1), (5,3), (5,5), (5,7) . . .
(7,1), (7,3), (7,5), (7,7) . . .
. . .

That is, pixels in odd-number columns and odd-number rows are read sequentially. Because one out of every two of both rows and columns is read, the number of read pixels is ¼th the entire pixel matrix.

Simple ¼ Thinning

In simple ¼ thinning, the rows and columns are again grouped in blocks of four rows and columns, respectively. Reading starts from the first row of the first row block (matrix rows 1 to 4) and the first column of the first column block (matrix columns 1 to 4) is read. Next, horizontal shift register 7 is advanced one stage to the second column block (matrix columns 5 to 8) and the horizontal selector circuit selects the first column of the second column block (matrix column 5) and the pixel at row 1, column 5 is read. Thereafter, columns 9, 13, 17, . . . are read sequentially in the same manner. After the last column of row 1 has been read, vertical shift register 3 is advanced one stage to the second row block (rows 5 to 8), the vertical selector circuit selects the first row of the second row block (matrix row 5). Meanwhile, the horizontal shift register 7 and the horizontal selector circuit 9 are reset to select column 1 as described above. Thus, the pixel at matrix row 5, column 1 is read. Thereafter, the horizontal shift register 7 and the horizontal selector circuit 9 are advance to select and read columns 5, 9, 13, . . . of row 5. Therefore, the sequence of selected pixels in simple ¼ thinning is as shown in the following table:

TABLE 2

(1,1), (1,5), (1,9) . . .
(5,1), (5,5), (5,9) . . .
. . .

In this case, because one out of every four rows and columns is read, 1/16th of the entire pixel matrix is read.

Zigzag Thinning

In the thinning examples described above, all the pixel information in ½ or ¾ of the rows and columns was not read. However, these unread rows and columns also have image data and skipping such rows and columns may produce an image of low quality that is somewhat unnatural. In zigzag thinning, pixel information from each row and column is sampled in a uniform manner. That is, when the sequence (rows and columns) of read pixels is as shown in the following table, data contained in all rows and all columns is read uniformly:

TABLE 3

(1,1), (2,3), (1,5), (2,7) . . .
(3,2), (4,4), (3,6), (4,8) . . .
(5,1), (6,3), (5,5), (6,7) . . .
. . .

To read in this way, a plurality of rows are read during a vertical retrace interval and the output of the vertical reading line is stored, preferably at capacitors CT1 and CT2 (shown in FIG. 2). For example, with reference to Table 3, when the first row block (consisting of matrix rows 1 and 2) is read, row 1 is read at the start of the horizontal retrace interval and the pixel information of columns 1, 5, 9, . . . is stored in a capacitor, and then row 2 is read and the pixel information of columns 3, 7, 11, . . . is stored in a capacitor. Then, during the horizontal read interval, the signals stored on capacitors CT1 and CT2 are read thereby providing the sequence of pixel information shown in table 3.

In the present embodiment, capacitors CT1 and CT2 accumulate only signals for selected columns. Namely, in the example discussed, the first column of each column block (matrix columns 1, 5, 9, . . . ) of row 1 and the third column of each column block (matrix columns 3, 7, 11, . . . ) for row 2 are stored by φS1, φS3, φTS, and φRC. During the horizontal reading interval, first AND gate group 31 in FIG. 3 is used, and the first column and third column of each column block are read by the signal from horizontal shift register 7 and selection signals φS1 and φS3. That is, columns 1, 3, 5, 7, . . . are read, but of these, because columns 3, 7, . . . are signals for row 2, the reading sequence becomes as shown in Table 3.

After the pixels of rows 1 and 2 (the first row block) have been read as described above, the pixels of rows 3 and 4 (the second row) block are read during the horizontal retrace interval. In this case, φS2 is used when reading row 3 pixels and columns 2, 6, 10, . . . are stored, and φS4 is used when reading row 4 pixels and columns 4, 8, 12, . . . are stored. As a result, selected pixels are switched sequentially by combining the addresses in vertical shift register 3 and horizontal shift register 7.

Next, the operation when executing this type of zigzag reading is explained using FIG. 5 and also referring to the circuits of FIGS. 1 to 3 described above.

In FIG. 5, T1, T2, T3, and T4 are horizontal retrace intervals, and T5 and subsequent numbers are horizontal reading intervals. FIG. 5 shows the timing chart when row i and row j are read and column I and column m are stored. In the example described above, i=1, j=2, l=1, 5, 9, . . . , and m=3, 7, 11, . . .

T1 in FIG. 5 is the resetting interval for pixels in row i, T2 is the reading interval for row i, T3 is the resetting interval for pixels in row j, and T4 is the reading interval for row j.

During T1, the pixel amplifying means for row i is reset and the dark output of each pixel in row i (in the example described above, row 1) is read. At this time, the horizontal reading means only operates for column I (in the example described above, columns 1, 5, 9, . . . ), and signals are accumulated in the accumulation means for each column (CT2 in FIG. 2).

Next, during T2, φTGi is applied to transmit signals to the amplifying means (QA in FIG. 2), and signal voltages are read by source-follower operation. The results are accumulated in the accumulation means CT1 (FIG. 2). At this time, because the horizontal reading circuit operates only for row 1, in the example described above, all pixels in row 1 are read, but only signals for column I (columns 1, 5, 9, . . . ) are accumulated in their respective accumulation means CT1.

During T3, row j (in the example described above, row 2) is reset, and the dark output of column m (in the example described above, columns 3, 7, 11, . . . ) is accumulated in the second accumulation means CT2.

During T4, φTGj is applied to transmit signals to the amplifying means (QA in FIG. 2), and signal voltages are read by source-follower operation. The results are accumulated in their respective accumulation means CT1. At this time, because the horizontal reading circuit operates only for row 2, in the example described above, all pixels in row 2 are read, but only signals for column m (columns 3, 7, 11, . . . ) are accumulated in their respective accumulation means CT1. T5 is the horizontal reading interval during which columns 1, 3, 5, 7, 9, and 11 are read by the horizontal shift register and the horizontal selection means, but because signals for row i (in the example described above, row 1) are accumulated for columns 1, 5, and 9 and signals for row j (in the example described above, row 2) are accumulated for columns 3, 7, and 11, by reading the columns sequentially, row i and column I, then row j and column m are read.

This method of thinning produces virtual rows comprising two adjacent rows of pixels because pixel from two rows are scanned and stored and then pixel information is read from the memory (e.g., capacitors CT1 and CT2) by sequential operation of the horizontal reading interval wherein signals are sequentially transferred to horizontal reading line LH by successive pulse signals H and RSTH. Thus, a real matrix of 16 by 16 pixels becomes a virtual matrix of 8 by 8 pixels.

Simple Thinning for Color

In the case of color camera elements, simple thinning may not provide signals for each color. For example, in the case of the pixel array of FIG. 4, wherein one out of every two pixels is thinned (i.e., not read), only signals for green (G) pixels are read. To avoid this, the pixels that should be selected within each column block are switched according to the addresses in horizontal shift register 7. In this case, the sequence of selected colors should be constant regardless of the reading mode. For example, by making the sequence of colors selected and read when reading by thinning the same as when reading all pixels, no processing is required such as switching the sequence of pixel colors later, and the circuit structure is preferable.

In the case of a pixel matrix that has the color array of FIG. 4, pixels are in the sequence G, R, G, B, G, R, G, B. . . . (G=green, R=red, and B=blue). Therefore, to read in the same color sequence when one out of every two pixels is thinned, a particular sequence must be followed. In this embodiment of simple color thinning, the columns are grouped in four-column blocks and the rows are grouped in four-row blocks. At row 1, the first and second columns of the first four-column block (matrix columns 1 and 2) are read, then the first and fourth columns in the second four-column block (matrix columns 5 and 8) are read, then the first and second columns in the third four-column block (matrix columns 9 and 10) are read, and so on. Thus, in odd-number four-column blocks the first and second columns are read, and in even-number blocks the first and fourth columns are read.

Next, row 3 in the first four-row block is read. In this row, the first and fourth columns of the odd-number blocks are read and the first and second columns in even-number blocks are read.

The vertical shift register then selects the second four-row block and the above-described pattern is repeated. As a result, the sequence of selected pixels becomes as shown in table 4.

TABLE 4

(1,1), (1,2), (1,5), (1,8), (1,9) . . .
(3,1), (3,4), (3,5), (3,6), (3,9) . . .
. . .

This sequence of reading pixels in the pixel matrix maintains the color sequence of the full matrix: G, R, G, B, G, R, G, B . . . is the present example. This sequence is presented in matrix form in table 5, with the selected, that is, read, pixels in upper case letters and the non-selected pixels in lower case letters.

TABLE 5

| G | R | g | b | G | r | g | B | G | R | g | b | G | r | g | B |
|---|---|---|---|---|---|---|---|---|---|---|---|---|---|---|---|
| g | b | g | r | g | b | g | r | g | b | g | r | g | b | g | r |
| G | r | g | B | G | R | g | b | G | r | g | B | G | R | g | b |
| g | b | g | r | g | b | g | r | g | b | g | r | g | b | g | r |
| G | R | g | b | G | r | g | B | G | R | g | b | G | r | g | B |
| g | b | g | r | g | b | g | r | g | b | g | r | g | b | g | r |
| G | r | g | B | G | R | g | b | G | r | g | B | G | R | g | b |
| g | b | g | r | g | b | g | r | g | b | g | r | g | b | g | r |

In this case, pixels shown by capital letters indicate read pixels and pixels shown by lower-case letters indicate pixels that are not read during thinning. In addition, the sequence of read pixels becomes G, R, G, B, G, R, G, B, . . . , and pixel signals are read that contain color data in the same sequence as when reading all pixels.

The example of simple ¼ thinning may also be applied to color thinning. In this method, wherein one out of every four pixels is thinned, only one row of each four-row block is read and only one pixel within each four-column block of a selected row is read. The read pixels by this reading sequence are shown in the following table.

TABLE 6

(1,1), (1,6), (1,9), (1,16) . . .
(5,1), (5,8), (5,11), (5,14) . . .
. . .

In matrix form, this sequence appears as shown in table 7, below.

TABLE 7

| G | r | g | b | g | R | g | b | G | r | g | b | g | r | g | B |
|---|---|---|---|---|---|---|---|---|---|---|---|---|---|---|---|
| g | b | g | r | g | b | g | r | g | b | g | r | g | b | g | r |
| g | r | g | b | g | r | g | b | g | r | g | b | g | r | g | b |
| g | b | g | r | g | b | g | r | g | b | g | r | g | b | g | r |
| G | r | g | b | g | r | g | B | g | r | G | b | g | R | g | b |
| g | b | g | r | g | b | g | r | g | b | g | r | g | b | g | r |
| g | r | g | b | g | r | g | b | g | r | g | b | g | r | g | b |
| g | b | g | r | g | b | g | r | g | b | g | r | g | b | g | r |

Color Zigzag Thinning

In the example of color thinning described above, for simplicity, there were unread rows in each block. However, because unread pixels also have image data, reading these produces an image that has higher quality and is more natural. To read in this way, several rows of pixels are read during the vertical retrace interval, and a means that stores the output of the vertical reading line is used. For example, in the case of the pixel matrix that has a color array of FIG. 4, first, when rows 1 and 2 in the first row block are read, row 1 is read at the start of the horizontal retrace interval and columns 1, 8, 9, 16, . . . are stored. Next, row 2 is read and signals for columns 4, 5, 12, 13, . . . are stored. In addition, during the horizontal reading interval, columns 1, 4, 5, 8, 9, 12, 13, 16, . . . are read sequentially.

After row 1 and 2 pixels have been read as described above, row 3 and 4 pixels in the first row block—that is, pixel matrix rows 3 and 4—are read during the next horizontal retrace interval. In this case, when pixel matrix row 3 is read, columns 4, 5, 12, 13, . . . are stored, and when row 4 is read, columns 1, 7, 8, 16, . . . are stored. Following this, the same operation is repeated such that rows 1 and 2 in the second row block are read, then rows 3 and 4 in the second row block are read. By scanning in this way, reading by thinning is executed in the same color sequence as when reading all pixels, and color data is obtained in each row.

The sequence of read pixels in this case is as follows:

TABLE 8

(1,1), (2,4), (2,5), (1,8), (1,9) . . .
(4,1), (3,4), (3,5), (4,8), (4,9) . . .
(5,1), (6,4), (6,5), (5,8), (5,9) . . .
. . .

In addition, when shown by color array, this sequence becomes as shown in the following table, in which color pixels shown by capital letters are read sequentially:

TABLE 9

| G | r | g | b | g | r | g | B | G | r | g | b | g | r | g | B |
|---|---|---|---|---|---|---|---|---|---|---|---|---|---|---|---|
| g | b | g | R | G | b | g | r | g | b | g | R | G | b | g | r |
| g | r | g | B | G | r | g | b | g | r | g | B | G | r | g | b |
| G | b | g | r | g | b | g | R | G | b | g | r | g | b | g | R |
| G | r | g | b | g | r | g | B | G | r | g | b | g | r | g | B |
| g | b | g | R | G | b | g | r | g | b | g | R | G | b | g | r |
| g | r | g | B | G | r | g | b | g | r | g | B | G | r | g | b |
| G | b | g | r | g | b | g | R | G | b | g | r | g | b | g | R |

Moreover, in the example described above, an example was shown in which the sequence of colors of read pixels is kept the same sequence as when all pixels are read and each row and column is read as uniformly as possible. However, this invention is not limited to this configuration, and pixels can be read in other sequences or a different sequence of colors of read pixels may be used from when all pixels are read.

Color ZigZag Thinning II

The above embodiment provides thinning that maintains the sequence of colors of reduced set of pixels. However, the pixel set is not perfectly uniform in that particular columns do not have selected pixels. Notably, columns 2, 3, 6, 7, 10, 11, 14 and 15 do not contain selected pixels.

In this embodiment, color zigzag thinning is uniform, that is an equal number of pixels are selected from each row and each column. As in the zigzag thinning methods described above, rows are selected in pairs and pixel information from particular columns of each row is stored in memory such as capacitors CT1 and CT2 and the row pair is read as a single row during the horizontal read interval.

Thus, in this zigzag thinning embodiment, the first row block includes matrix rows 1 and 2. During the retrace interval of row 1, columns 7, 8, 15, 16, . . . n are stored on respective capacitors CT1 and during the retrace interval of row 2, columns 3, 4, 11, 12, . . . n are stored on the respective capacitors CT1. Then, during the horizontal read interval, pixel information is read sequentially from the capacitors CT1 for the row block. Thus, the pixels are read in the sequence of table 10.

TABLE 10

(2,3) (2,4) (1,7) (1,8) (2,11) (2,12) (1,15) (1,16) . . .
(4,1) (4,2) (3,5) (3,6) (4,9) (4,10) (3,13) (3,14) . . .
(6,3) (6,4) (5,7) (5,8) (6,11) (6,12) (5,15) (5,16) . . .
. . .

This method provides a color sequence of G R G B . . . in a first row and G B G R . . . in a next row in the same sequence as the full matrix. Moreover, this thinning method reads pixels uniformly from each row and column. Table 11 shows the selected pixels in the color pixel matrix.

TABLE 11

| g | r | g | b | g | r | G | B | g | r | g | b | g | r | G | B |
|---|---|---|---|---|---|---|---|---|---|---|---|---|---|---|---|
| g | b | G | R | g | b | g | r | g | b | G | R | g | b | g | r |
| g | r | g | b | G | R | g | b | g | r | g | b | G | R | g | b |
| G | B | g | r | g | b | g | r | G | B | g | r | g | b | g | r |
| g | r | g | b | g | r | G | B | g | r | g | b | g | r | G | B |
| g | b | G | R | g | b | g | r | g | b | G | R | g | b | g | r |
| g | r | g | b | G | R | g | b | g | r | g | b | G | R | g | b |
| G | B | g | r | g | b | g | r | G | B | g | r | g | b | g | r |

Partial Reading

In the examples described above, the entire pixel matrix was uniformly thinned. However, on occasion, it is desired to obtain an image with good resolution from a portion of the pixels. A method of reading by selecting only pixels in a portion of the matrix is explained below.

In this embodiment, signals in row and column blocks that are outside the portion of interest are not read. However, pixels that are outside the area of interest are reset to prevent blooming.

An example is considered in which the pixels to be read are from row 130 to row 283 and from column 262 to column 358. This range reflects a portion of interest in a matrix of pixels that is at least as large as 283 by 358, and more likely is on the order of 400 by 600 pixels, or larger. Preferably, rows and columns are grouped in four row/column blocks, respectively.

Starting at row block 1, all row-block rows are selected and the signals φTG and φRG are generated (i.e., made high or low so as to turn on switches QT and QR, respectively) to reset all pixels in all four rows of the row block by advancing through all columns. To select all rows within each row block, signals φS1, φS2, φS3, and φS4 are applied to generate φTG and φRG for all rows. After row block 1, the vertical shift register advances to row block 2 and all rows are selected to reset all pixels in the rows of row block 2 (corresponding to matrix rows 5 to 8). This process repeats until row block 32 (matrix rows 125 to 128) is encountered. As a result of resetting the pixels in rows 1 through 128, accumulated pixel charges are discharged without reading the signals thereby preventing blooming.

The next row block, row block 33, includes rows within the portion of interest. The first row of row block 33 is row 129, still outside the portion of interest: thus, the same reset operation as described above is performed. Up to this interval, scanning is performed at high speed without activating horizontal shift register 7.

The second row of row block 33 is row 130, which is a row within the portion of interest. Thus, pixel signals in row 130 are read by generating the signals φTD, φRD, and φRG to read pixel signal information.

However, even during horizontal reading of rows within the portion of interest, column blocks that are outside the portion of interest are not read. Stating at row 130, processing proceeds sequentially while advancing horizontal shift register 7 one stage at a time. When the column block that requires reading—in the example described above, the 66th column block—is reached, pixels are read sequentially from the second column of this column block. When reading of column 264 is completed, horizontal shift register 7 is advanced one stage and all columns of the 67th column block are read. This operation is repeated until column block 90, which includes columns 358 and 359, is reached. Column 358 is read as above, but columns 359 and 360 are not read. And, because subsequent pixels are not required, horizontal shift register 7 is advanced sequentially at high speed without reading subsequent columns.

Next, the third row of the same row block—that is, matrix row 131—is read, and pixels from column 262 to column 358 are read in the same manner. Furthermore, after row 132 is read, vertical shift register 3 is advanced one stage to proceed to the 67th row block, and this is read from the first row to the fourth row.

This operation is then repeated until row 283, the last row to be read. When reading of row 283 is completed, the operation ends by executing the pixel reset operation on the remaining rows.

Reducing Power Consumption

Because electronic cameras are normally battery powered, it is desirable to limit power consumption by the camera. Therefore, the number of frames produced when reading a thinned pixel set is preferably kept the same as the number of frames when reading all pixels. For example, when the number of quadrupled camera frames for thinned pixel sets is kept the same as the number of quadrupled camera frames for entire pixel sets, three out of four frames within the number of frames produced at high speed can be made to stop operating by cutting off electric power to all camera elements. As a result, power consumption is reduced to one fourth. In addition, when pixels are read at a rate of ¼ vertically and horizontally for a total of ¹⁄₁₆ pixels read, power consumption can be reduced to ¹⁄₁₆ th.

Furthermore, as explained for FIG. 2 described above, power consumption can be reduced still more by installing circuit PS2 on the vertical reading line that cuts off current, by stopping pixel source-follower operation, for columns that are not read. Also, control circuit PS1 stops and cuts off operation of vertical reading circuits for those columns.

For example, in the case of simple thinning described above, columns 2, 4, 6, . . . are not read. Therefore, vertical reading circuits for non-selected columns can be cut off electrically by cutting off the constant current means and buffer amplifier by turning off circuits PS1 and PS2 in the circuit of FIG. 2. Preferably, this is accomplished by applying signal φPS1 and φPS2 as the power source control signals from the second AND gate group 33 in FIG. 3. In addition, for example, φS1 and φS3 may be applied simultaneously to select odd-number columns and cut off even-number columns, and conversely, φS2 and φS4 may be applied simultaneously to select even-number columns and cut off odd-number columns, and PS1 and PS2 may be controlled by the output of an AND gate. By reducing camera element power consumption in this way, heat generation is reduced, dark current is decreased, and images can be photographed with high image quality.

The power consumption techniques described above may also be employed in other thinning methods such as zigzag thinning wherein the first row (in the case of IS pixels, rows 1 and 2), columns 2, 4, 6, . . . are not read, and in the second row (in the case of IS pixels, rows 3 and 4), columns 1, 3, 5, . . . are not read.

Variant Examples

In the mode of embodiment of this invention described above, four columns and four steps of pixels were assigned to each stage of the horizontal and vertical shift registers, but this was to facilitate understanding and to match the number of pixels in current solid-state camera devices and display devices. However, this invention is not limited to this configuration, and needless to say, other numbers of pixels may be assigned to each stage. In addition, for pixel selection in the case of color camera devices as well, because each block contains pixels in all colors, it is clear that pixels can be selected sequentially according to the pixel array. That is, selection signals may be generated and controlled such that pixels within each block are read in the same sequence as when reading all pixels.

In addition, even when the color array differs from FIG. 4, color arrays are basically constructed by combining the three primary colors of R, G, and B or their three complementary colors of cyan, magenta, and yellow. Therefore, because the basic block in this invention of 4 rows×4 columns for a total of 16 pixels should always contain pixels of the desired colors, pixels of the desired colors may be selected by combining shift register stages and selection signals (φS1, φS2, φS3, and φS4). In this case as well, preferably, the basic principle is followed of reading pixels in the same color sequence as when reading all pixels, and still more preferably, pixels are read in as uniform a distribution as possible without favoring any particular row and column.

Global Preset

The invention described above was explained in terms of a preferred method of using vertical and horizontal shift registers. Alternatively, the shift registers that can be preset globally for simultaneous reading of a plurality of rows or columns.

Simultaneous Selection of Several Rows

When the vertical shift register is preset globally, all stages may be read simultaneously. In the preferred embodiments of the invention, because the vertical selector circuit is installed after the vertical shift register, for example, when φS1 is applied, the first row of all row blocks, rows 1, 5, 9, . . . (4N+1 (N= 0, 1, 2, . . . ) can be selected simultaneously. When φS1 and φS3 are applied, all odd-number rows of all row blocks can be selected simultaneously. Alternately, when φS1 through φS4 are applied, all rows can be selected. Because pixels of this invention are read with amplifying means QA as a source-follower, when pixels are read by selecting several rows simultaneously, the maximum luminance component within the selected rows is read as the signal outputted by the vertical reading line.

Simultaneous Selection of Several Rows: Monochrome

Therefore, in the case of a black-and-white image sensor, when pixels are read sequentially by the horizontal selection means by selecting and reading all rows simultaneously, this obtains the horizontal distribution of maximum luminance signals of pixels in each column. Because the horizontal scanning means need only scan when reading this distribution, setting exposure conditions, for example, can be set high speed.

Simultaneous Selection of Several Rows: Color

In the case of a color image sensor, such as the color array shown in FIG. 4, when all rows are read as described immediately above, green (G) signals are read in odd-number columns, and a mixture of red (R) and blue (B) signals are read in even-number columns.

In cases when this is not desirable, the luminance levels of individual colors may be read separately. For example, when only odd-number rows by applying φS1 and φS3, G signals are read in odd-number columns 1, 3, 5, . . . , R signals are read in even-number columns 2, 6, 10, . . . , and B signals are read in even-number columns 4, 8, 12, . . . .

Alternately, when only even-number rows are selected by applying φS2 and φS4, G signals are read in odd-numbered columns 1, 3, 5, . . . (as above), B signals are read from columns 2, 6, 10, . . . , and R signals are red from even-number columns 4, 8, 12, . . . .

When either of these methods is used, signals for setting exposure conditions are obtained in one cycle of scanning by the horizontal scanning means, and when both are used, more detailed data are obtained in two cycles of scanning by the horizontal scanning means.

Furthermore, by applying signals sequentially from φS1 to φS4, a more exact luminance distribution for each color is obtained in four cycles of horizontal scanning.

Simultaneous Selection of Several Columns

When a shift register that can be preset for all stages is used as the horizontal shift register, pixels can be read by synthesizing reading signals for several columns horizontally. As a result, vertical luminance distribution data, for example, can be obtained. In this case, because a selection means—that is, horizontal selector circuit 9—is installed after the horizontal shift register in this invention, when a desired row is selected and read by vertical shift register 3 and vertical selector circuit 5, signals for pixels in each column of the row selected are outputted by the vertical reading line. In this case, when the horizontal shift register is preset for all stages and all or some of signals φS1, φS2, φS3, and φS4 is applied, signals for the desired number of columns in the selected row are added and outputted. That is, a signal is obtained that is the sum of pixels for several columns in the selected row.

Simultaneous Selection of Several Columns: Monochrome

Therefore, in the case of a black-and-white image sensor, when all stages of the horizontal shift register are preset for each row and signals φS1, φS2, φS3, and φS4 are applied to horizontal selector circuit 9 simultaneously, signals for all columns of the selected row are added and outputted. Therefore, by repeating this operation for each row, vertical luminance distribution can be obtained at high speed.

Simultaneous Selection of Several Columns: Color

In the case of a color image sensor, in the case of the color array shown in FIG. 4 of this invention, for example, when all columns are read as described above, a signal is obtained in which the green (G) component in the selected row is added to the red (R) and blue (B) components.

By contrast, when the horizontal shift register is preset for all stages and signals φS1 and φS3 are applied, the sum of the green (G) component in the selected row is obtained.

In addition, when odd-number rows are selected, only signal φS2, and when even-number rows are selected, only signal φS4 is applied, and the sum of the red (R) component in the selected row is obtained.

Alternately, when odd-number rows are selected, only signal φS4, and when even-number rows are selected, only signal φS2 is applied, and the sum of the blue (B) component in the selected row is obtained.

In this way, the distribution of signal components of each color can be obtained.

Figure 6:
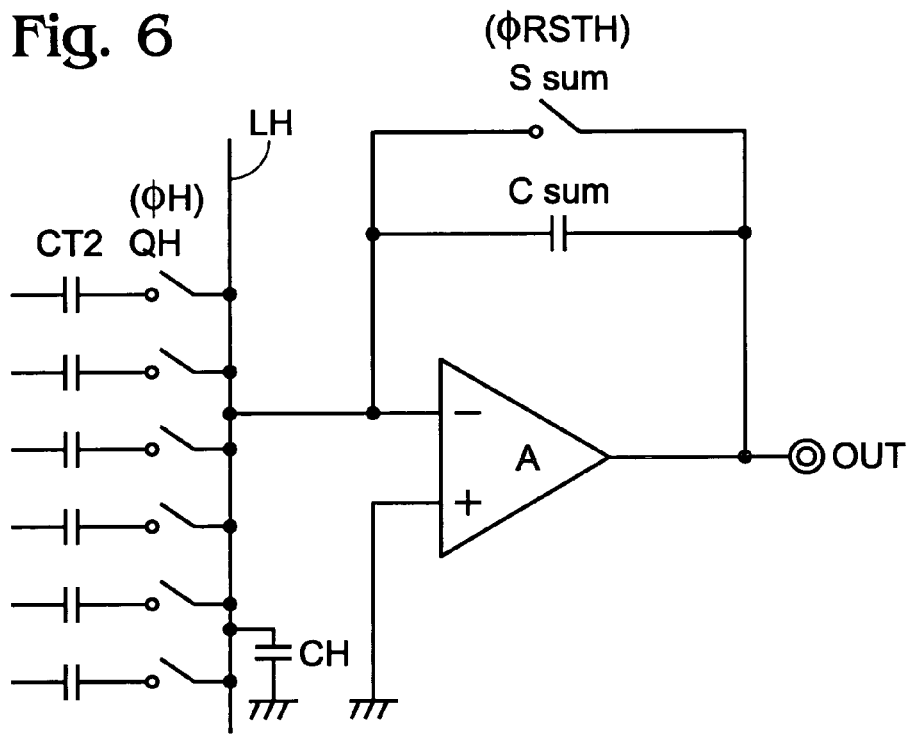
FIG. 6 is a schematic circuit diagram showing a preferred embodiment of an addition circuit used for reading pixels in several columns simultaneously.

FIG. 6 shows one example of an addition circuit for obtaining synthesized signals for several columns in this way. The addition circuit of FIG. 6 has amplifier A that has an inverted input terminal connected to horizontal reading line LH and a noninverted input terminal connected to the ground. Addition capacitor Csum and switch Ssum circuits are connected in parallel between the output terminal and inverted input terminal of this amplifier A.

In the addition circuit of FIG. 6, switch Ssum is turned on by signal φRSTH and resets the charges of standardized capacitor CH of horizontal reading line LH and addition capacitor Csum. Next, switch Ssum is turned off and reading switches QH corresponding to the desired several columns are turned on by horizontal selection signal φQH. As a result, by turning reading switches QH on, the charges of the selected capacitors CT2 are added efficiently in horizontal reading line LH and transferred to addition capacitor Csum. As a result, a signal corresponding to the charge accumulated in addition capacitor Csum can be outputted as a reading signal from output terminal Out.

Moreover, when a signal synthesizing vertical signals is obtained by selecting several rows simultaneously, the signal is obtained for the pixel that has maximum luminance in each column. By contrast, by selecting several columns simultaneously, when a horizontal synthesized signal is obtained, a signal is obtained that is the sum of the luminance in each row.

By collecting vertical synthesized signals by selecting several rows simultaneously in this way, the horizontal luminance distribution is obtained, and by obtaining a horizontal synthesized signal by further selecting several columns simultaneously obtained for each row, the vertical luminance distribution is obtained. As a result, exposure conditions in an electronic camera or other device, for example, can be set with high precision.

Camera

Figure 7:
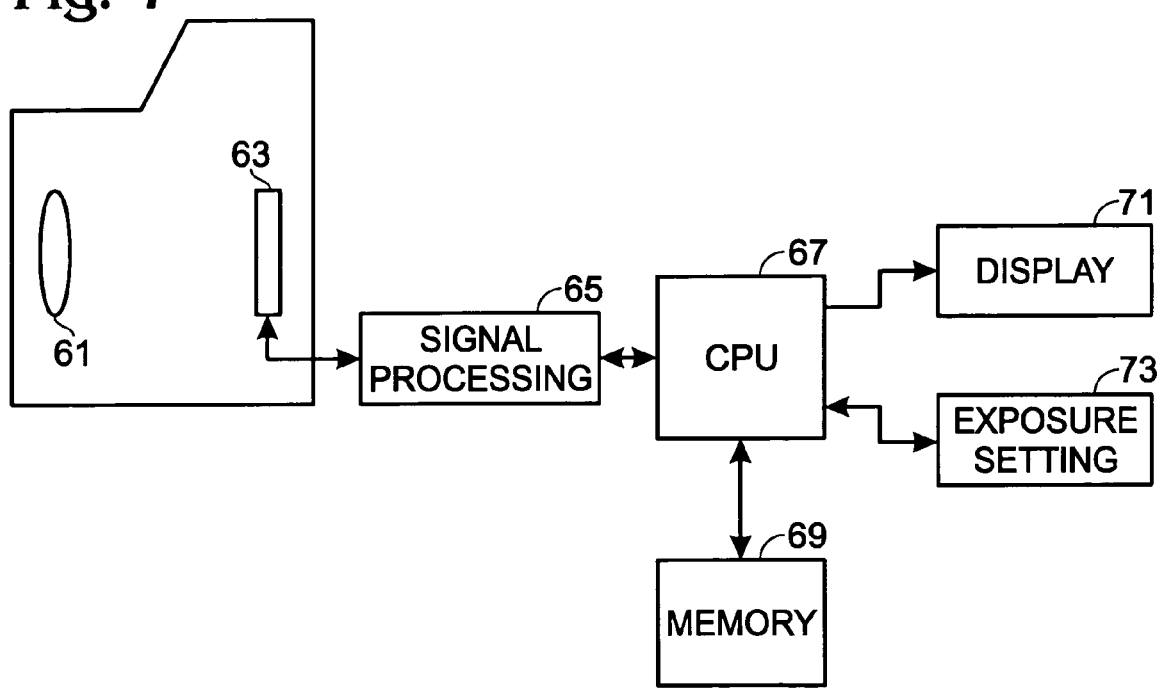
FIG. 7 is a block diagram showing a schematic structure of an electronic camera that uses a solid-state camera device of the present invention.

FIG. 7 shows a structural diagram of an electronic camera of the present invention. The electronic camera includes camera lens 61, solid-state camera device 63, signal processing circuit 65, central processing unit (CPU) (e.g., a microprocessor) 67, memory 69, display device 71, and exposure control circuit 73.

Preferably, solid-state camera device 63 is the solid-state camera device described above and shown in FIGS. 1 through 3 and related embodiments. Memory 69 includes RAM and ROM for CPU 67 and an image memory device for storing image signals. The image memory may be any desire memory device such as a floppy disk drive, flash card memory, hard disk drive, or IC card. Moreover, the image memory may be located in the electronic camera or it may be external or removable memory.

Preferably, the display device 71 is a liquid crystal display, and the number of display pixels of the liquid crystal display may be less than the number of pixels of the solid-state camera device 63. Display device 71 may be housed within an electronic camera housing or externally coupled to the camera.

In this electronic camera, an image is thinned and read by solid-state camera device 63 before photographing and when displayed on display device 71 by signal processing circuit 65 and CPU 67. When the number of pixels of the display device 71 is less than the number of pixels of the solid-state camera device 63, an image from the camera device 63 can be made to conform to the display device by thinning and reading so that the image can be displayed at low power consumption and higher speed as compared to reading the entire pixel matrix of the camera device.

In addition, when setting photographic conditions by exposure control circuit 73, image signals obtained by thinning and reading can be processed by signal processing circuit 65 and CPU 67 and exposure settings can be set at high speed. After displaying and setting exposure conditions in this way, solid-state camera device 63 reads all pixels of the entire pixel matrix to obtain a high resolution image signal that is stored in memory 69. As a result, the photographic image that is recorded is a high resolution image.

SUMMARY

According to the present invention, images may be displayed on an electronic display device, such as an LCD, at high speed and relatively lower power even when the number of display pixels of the display device is fewer than a number of light receiving pixels of the solid-state camera device.

In addition, when image signals obtained from a solid-state camera device are used for setting photographing conditions before photographing, image signals can be obtained by reading and thinning at high signal speed, and low power consumption. Therefore, photographing conditions can be set rapidly before photographing.

Also, to set exposure conditions, such as shutter speed or aperture, it is desirable to obtain image data for as wide a range within the image plane as possible. However, it is not necessary to read all the pixels in the pixel matrix. By using an image signal that has been thinned to ¼ or ¹⁄₁₆, data required for setting exposure conditions can be obtained quickly.

Furthermore, by reading a particular portion of the pixel matrix, and possibly combining information of the portion of interest with data obtained by reading and thinning, exposure conditions can be set with emphasis placed on the portion of interest. Therefore, even when setting exposure conditions, this makes it possible to set conditions more accurately and with greater freedom.

This patent specification sets forth a detailed description of a preferred embodiment of the invention as known to the inventor(s) at the time the underlying patent application was filed. Also disclosed are such alternative embodiments, known at the time of filing, that readily occur to the inventor(s). No attempt is made to describe all possible embodiments, modes of operation, designs, steps or means for making and using the invention. To include all such information would unduly confuse the description of the preferred embodiment and would not serve to provide further information to persons skilled in the art of this invention.

Where necessary, the specification describes the invention and states certain arrangements of parts, materials, shapes, steps, and means for making and using the invention. However, the invention may be made and used with alternative arrangements, materials, and etceteras. It is not possible to identify and list all such possibilities. Thus, it is intended that the scope of the invention shall only be limited by the language of the claims and the law of the land as pertains to valid patents.

What is claimed is:

1. A solid-state camera device having a pixel matrix with a plurality of photoelectric pixels arranged in a plurality of rows and columns, and a vertical scanning circuit that selects a row of the plurality of rows of photoelectric pixels, and a horizontal scanning circuit that selects a column of the plurality of columns of photoelectric pixels, and wherein an image signal is read by selecting at least one photoelectric pixel by the vertical scanning circuit and horizontal scanning circuit and transferring a charge from the at least one selected photoelectric pixel, the improvement comprising:

a vertical group scanning circuit and a vertical selector circuit included in the vertical scanning circuit, the vertical group scanning circuit selecting successive row groups that each includes a plurality of rows, the vertical selector circuit selecting at least one desired row within each successive row group selected by the vertical group scanning circuit to provide a row pixel set, the successive row groups extending substantially completely across the pixel matrix in a vertical direction; and a horizontal group scanning circuit and a horizontal selector circuit included in the horizontal scanning circuit, the horizontal group scanning circuit selecting successive column groups that each includes a plurality of columns, the horizontal selector circuit selecting at least one desired column within each successive column group selected by the horizontal group scanning circuit to provide a column pixel set, the successive column groups extending substantially completely across the pixel matrix in a horizontal direction.

2. The solid-state camera device of claim 1 wherein the horizontal selector circuit includes memory that stores each column pixel set and the vertical selector circuit includes memory that stores each row pixel set, and wherein the horizontal scanning circuit reads the stored column pixel sets sequentially by horizontal reading intervals and the vertical scanning circuit reads the stored row pixel sets sequentially by vertical reading intervals.

3. The solid-state camera device of claim 1 wherein the photoelectric pixels of the pixel matrix are arranged in a first sequence of color, and the vertical scanning circuit and horizontal scanning circuit read a non-contiguous reduced image set from the pixels in a sequence of color that is substantially Identical to the first sequence of color.

4. The solid-state camera device of claim 1 wherein the horizontal selector circuit has a power cutoff function that interrupts power to the columns not selected by the horizontal selector circuit and the vertical selector circuit has a power cutoff function that interrupts power to the rows not selected by the vertical selector circuit.

5. The solid-state camera device of claim 1 wherein the vertical group scanning circuit and the horizontal group scanning circuit are each comprised of shift registers that can be preset globally so as to select simultaneously a plurality of spaced-apart row groups and a plurality of spaced-apart column groups, respectively.

6. A method of determining a maximum luminance of a plurality of pixels in a first column of photoelectric pixels of the solid-state camera of claim 5, comprising the steps of simultaneously reading a plurality of rows.

7. A method of summing image signals from a plurality of photoelectric pixels of a first row of photoelectric pixels of the solid-state camera of claim 1, comprising the steps of reading a plurality of columns simultaneously.

8. The solid-state camera device of claim 1 wherein the photoelectric pixels that are read can be reset.

* * * * *